United States Patent
Cahill et al.

(10) Patent No.: US 9,069,620 B2
(45) Date of Patent: Jun. 30, 2015

(54) CREATING AND DEPLOYING SERVICE-READY VIRTUAL HARD DISKS

(75) Inventors: Jason M. Cahill, Woodinville, WA (US); Alexander Hopmann, Seattle, WA (US); Marc Keith Windle, Woodinville, WA (US); Erick Raymundo Lerma, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 12/908,671

(22) Filed: Oct. 20, 2010

(65) Prior Publication Data

US 2012/0102487 A1 Apr. 26, 2012

(51) Int. Cl.
*G06F 9/50* (2006.01)
*H04L 29/08* (2006.01)

(52) U.S. Cl.
CPC .......... *G06F 9/5077* (2013.01); *H04L 67/1097* (2013.01)

(58) Field of Classification Search
CPC ... G06F 9/45533; G06F 9/45558; G06F 8/63; G06F 8/65; G06F 2009/45562; G06F 2009/45575; G06F 9/5077
USPC ............................. 709/212, 217–219; 718/1
See application file for complete search history.

(56) References Cited

U.S. PATENT DOCUMENTS

| | | | |
|---|---|---|---|
| 7,257,584 B2 * | 8/2007 | Hirschfeld et al. ............ 1/1 |
| 7,653,794 B2 | 1/2010 | Michael | |
| 7,802,000 B1 * | 9/2010 | Huang et al. ................. 709/228 |
| 7,810,092 B1 * | 10/2010 | van Rietschote et al. ......... 718/1 |
| 8,135,818 B2 * | 3/2012 | Heim ............................ 709/223 |
| 8,219,987 B1 * | 7/2012 | Vlaovic et al. .................... 718/1 |
| 8,291,180 B2 * | 10/2012 | Austruy et al. ............... 711/162 |
| 2002/0069369 A1 | 6/2002 | Tremain | |
| 2004/0117338 A1 | 6/2004 | Kennedy ............................... 1/1 |
| 2005/0149682 A1 | 7/2005 | Kim | |
| 2006/0271803 A1 | 11/2006 | Harada | |
| 2007/0260831 A1 | 11/2007 | Michael ........................ 711/162 |
| 2009/0083404 A1 * | 3/2009 | Lenzmeier et al. ........... 709/221 |
| 2009/0164790 A1 | 6/2009 | Pogodin | |
| 2009/0300210 A1 | 12/2009 | Ferris | |

(Continued)

OTHER PUBLICATIONS

GilsMethod.com; "How to Create a New Virtual Machine in VirtualBox"; Retrieved Date: Sep. 13, 2010; http://www.gilsmethod.com/how-to-create-a-new-virtual-machine-in-virtualbox.

(Continued)

*Primary Examiner* — Chirag R Patel
(74) *Attorney, Agent, or Firm* — Tom Wong; Jim Ross; Micky Minhas

(57) ABSTRACT

A cloud manager controls the deployment and management of machines for an online service. A build system creates deployment-ready virtual hard disks (VHDs) that are installed on machines that are spread across one or more networks in farms that each may include different configurations. The build system is configured to build VHDs of differing configurations that depend on a role of the virtual machine (VM) for which the VHD will be used. The build system uses the VHDs to create virtual machines (VMs) in both test and production environments for the online service. The cloud manager system automatically provisions machines with the created virtual hard disks (VHDs). Identical VHDs can be installed directly on the machines that have already been tested.

17 Claims, 10 Drawing Sheets

(56) References Cited

U.S. PATENT DOCUMENTS

| | | | |
|---|---|---|---|
| 2010/0122248 A1 | 5/2010 | Robinson | 718/1 |
| 2011/0010515 A1 | 1/2011 | Ranade | 711/162 |
| 2011/0022694 A1* | 1/2011 | Dalal et al. | 709/222 |
| 2011/0197039 A1 | 8/2011 | Green | 711/162 |
| 2012/0005673 A1* | 1/2012 | Cervantes et al. | 718/1 |

OTHER PUBLICATIONS

Yuen, E.; "*Real Control with Virtual Machine Manager 2007*"; Retrieved Date: Sep. 13, 2010; http://technet.microsoft.com/en-us/magazine/2008.01.scvmm.aspx.

Ehow.com; "*How to Create a Virtual PC*"; Retrieved Date: Sep. 13, 2010; http://www.ehow.com/how_$_{2214160}$_virtual-pc.html.

Gold-software.com; "*Virtual Drive Creator* ™ *2.0.2*"; Retrieved Date: Sep. 13, 2010; http://www.gold-software.com/download4538.html.

Dkszone.net; "*Create VHD (Virtual Hard Disk) on Windows 7/Vista/XP Using Disk2vhd*"; Retrieved Date: Sep. 13, 2010; http://www.dkszone.net/create-vhd-virtual-hard-disk-on-windows-using-disk2vhd.

International Search Report dated Apr. 27, 2012, issued in PCT/US2011/054515.

"First Office Action and Search Report Issued in Chinese Patent Application No. 201110340497.8", Mailed Date: Dec. 23, 2013, 12 Pages.

"Second Office Action and Search Report Issued in Chinese Patent Application No. 201110340497.8", Mailed Date: Aug. 26, 2014, 15 Pages.

"Third Office Action Issued in Chinese Patent Application No. 201110340497.8", Mailed Date: Feb. 28, 2015, 8 pages.

\* cited by examiner

```xml
<Project xmlns="http://schemas.microsoft.com/developer/msbuild/2003" ToolsVersion="3.5">
  <Import Project="$(GIBS_PATH)\GIBS.Targets"/>

<PropertyGroup>                    710
    <SharePointVersion>14.0.3524.1004</SharePointVersion>
    <SharePointPath>sharepoint\$(SharePointVersion)_OfficeServer_none_ship_x64_en-us</SharePointPath>
  </PropertyGroup>

<ItemGroup>                        720
    <ProjectReference Include="$(basesharepoint-projpath)"/>
    <ResourceReference Include="\\officerel\RELEASES\Office14\server\en-us\$(SharePointPath)">
      <RelativePath>$(SharePointPath)</RelativePath>
    </ResourceReference>
  </ItemGroup>

<Target
    Name="default"
    DependsOnTargets="RunDependencies"           730
    Inputs="$(basesharepoint-vhdfullpath)"
    Outputs="$(wfe-vhdfullpath)">

<NewVM Name="WFE" ComputerName="WFE" VHD="$(basesharepoint-vhdfullpath)"/>
    <StartVM Name="WFE"/>
    <PowerShell ScriptFiles="Install-SharePoint.ps1 -WFE -Version $(SharePointVersion)" ComputerName="WFE"/>
    <ShutdownVM Name="WFE" Sysprep="True"/>
    <RemoveVM VHDPath="$(wfe-vhdfullpath)" ManifestPath="$(wfe-manifestfullpath)"/>

</Target>
</Project>
```

*Fig. 7*

CREATING AND DEPLOYING SERVICE-READY VIRTUAL HARD DISKS

BACKGROUND

Web-based services include files that are located on web servers along with data that is stored in databases. For example, there are a large number of servers located within different networks to handle the traffic that is directed to the service. Managing the deployment and operations of the online service that includes a large number of servers is a time consuming process that requires a large operations staff that is subject to human error.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A cloud manager controls the deployment and management of machines for an online service. A build system creates deployment-ready virtual hard disks (VHDs) that are installed on machines that are spread across one or more networks in farms that each may include different configurations. The build system is configured to automatically build VHDs of differing configurations that depend on a role of the virtual machine (VM) for which the VHD will be used. The build system uses the VHDs to create virtual machines (VMs) in both test and production environments for the online service. The cloud management system automatically provisions machines with the created virtual hard disks (VHDs). Identical VHDs can be installed directly on the machines that have already been tested.

BRIEF DESCRIPTION OF THE DRAWINGS

FIG. 7 shows an exemplary project file used in the build system;

DETAILED DESCRIPTION

Figure 1:
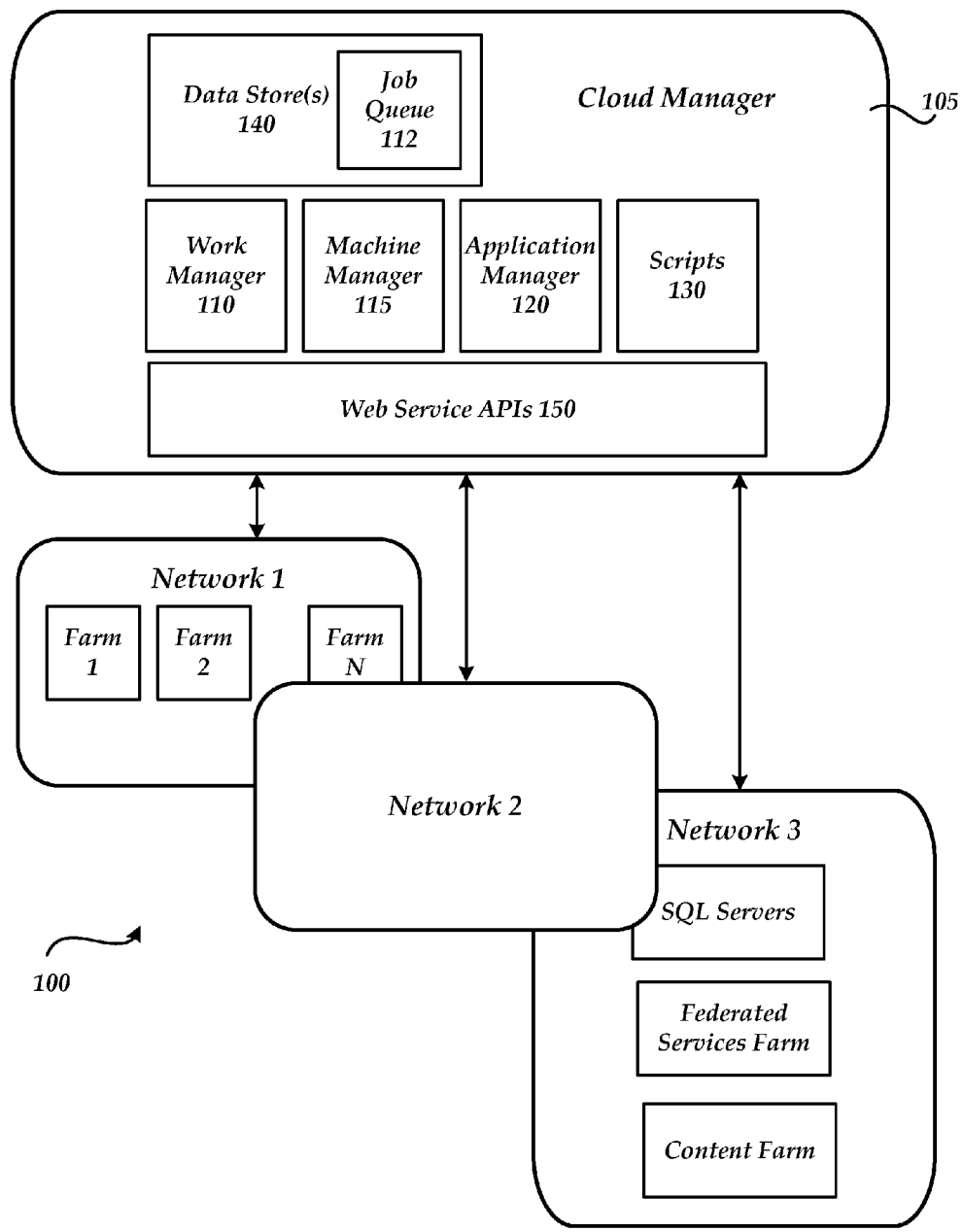
FIG. 1 illustrates a cloud manager system for managing networks that are associated with an online service, such as a content management service.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a cloud management system for managing networks that are associated with an online service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Work manager 110 manages the execution of tasks and enables scheduling and retry of longer running tasks. Work manager 110 starts jobs stored in job queue 112 and keeps track of running jobs. When a predetermined time has elapsed, work manager 110 may automatically cancel the task and perform some further processing relating to the task. According to one embodiment, the tasks in job queue 112 are executed by work manager 110 by invoking one or more scripts 130. For example, a scripting language such as Microsoft's PowerShell® may be used to program the tasks that are executed by work manager 110. Each script may be run as a new process. While executing each script as a new process may have a fairly high CPU overhead, this system is scalable and helps to ensure a clean environment for each script execution plus full cleanup when the script is completed.

Machine manager 115 is configured to manage the physical machines in the networks (e.g. Network 1, Network 2, Network 3). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 3. In response to a request to cloud manager 105, machine manager 115 locates a suitable Physical Machine that is located on Network 3 and configures the VM according to the VM Image associated with the VM's Role. The physical machine is configured with a VHD of type Foo with version 12.34.56.78 that is stored within a data store, such as data store 140. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2, Network 3) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the tasks that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. Generally, a network may continue to grow as long as the networking limits (e.g. load balancer and network switches) are not exceeded. For example, a network may start out with ten servers and later expand to one hundred or more servers. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 is designed to do very little processing (<10 ms, <50 ms) before returning a response to any given request. Cloud manager 105 maintains records to keep track of current requests. For example, cloud manager 105 updates records in a local database and if necessary schedules a "job" to perform more lengthy activity later.

Cloud manager keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

Figure 2:
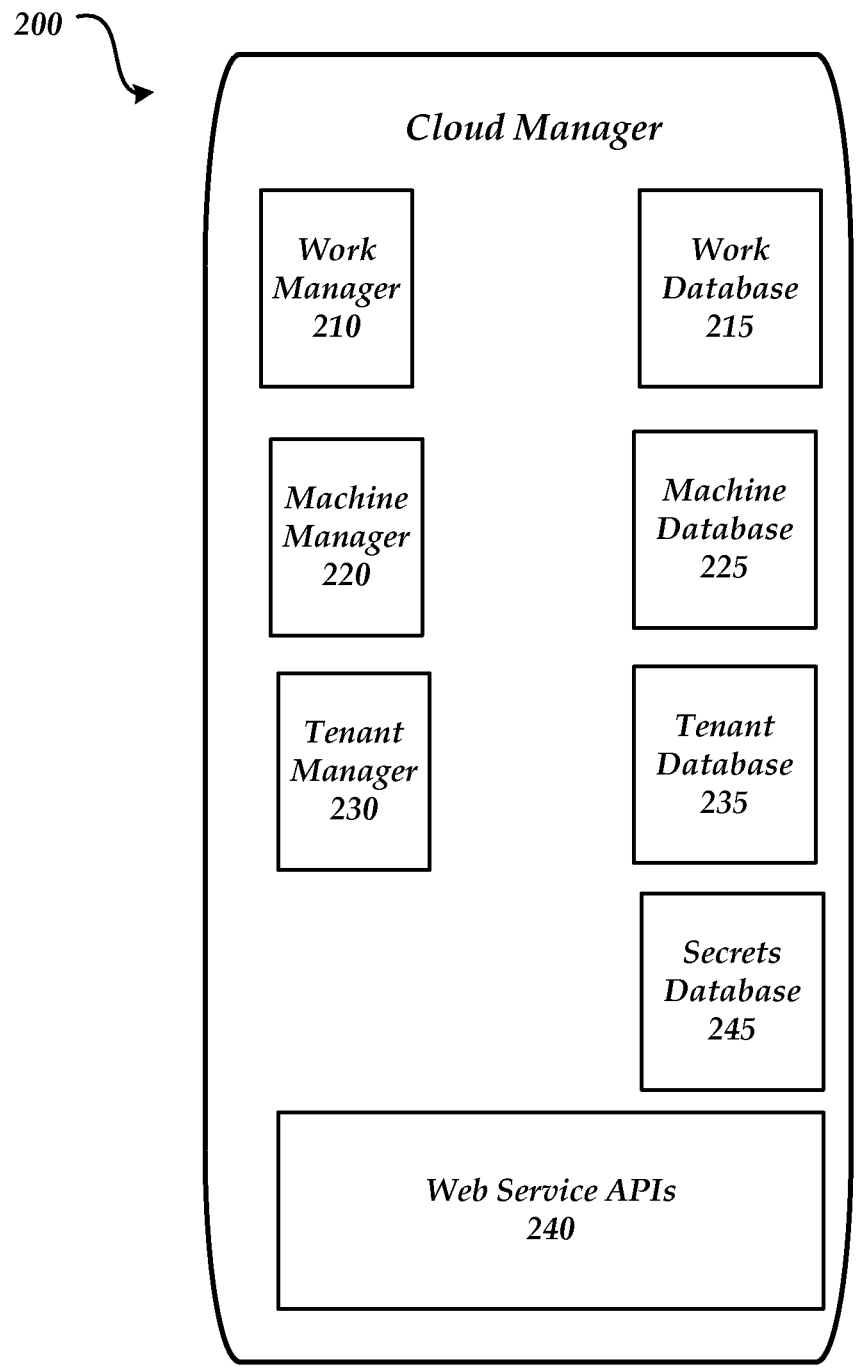
FIG. 2 shows a cloud manager including managers and associated databases.

FIG. 2 shows a cloud manager including managers and associated databases. As illustrated, cloud manager 200 comprises work manager 210, work database 215, machine manager 220, machine database 225, tenant manager 230, tenant database 235, secrets database 245 and web service APIs 240.

Generally, databases used within a cloud management system (e.g. system 100) are sized to enable high performance. For example, a database (such as work database 215, machine database 225, tenant database 235 and secrets database 245) may not exceed a predefined size limit (e.g. 30 GB, 50 GB, 100 GB, and the like). According to an embodiment, a database is sized such that it is small enough to fit in-memory of a physical machine. This assists in high read I/O performance. The size of the database may also be selected based on performance with an application program, such as interactions with a SQL server. The databases used in the farms may also be sized to enable high performance. For example, they may be sized to fit in-memory of the host machine and/or sized such that backup operations, move operations, copy operations, restore operations are generally performed within a predetermined period of time.

Cloud manager 200 divides the cloud manager data into four databases. The work database 215 for the work manager. The machine database 225 for the machine manager 220. The tenant database 235 for the tenant manager 230 and a secrets database 245 for storing sensitive information such as system account and password information, credentials, certificates, and the like. The databases may be on the same server and or split across servers. According to an embodiment, each database is mirrored for high availability and is a SQL database.

Cloud manager 200 is configured to interact with the databases using a reduced set of SQL features in order to assist in providing availability of the cloud manager 200 during upgrades of the databases. For example, foreign keys or stored procedures are attempted to be avoided. Foreign keys can make schema changes difficult and cause unanticipated failure conditions. Stored procedures place more of the application in the database itself.

Communications with the SQL servers are attempted to be minimized since roundtrips can be expensive compared to the cost of the underlying operation. For example, it is usually much more efficient if all of the current SQL server interactions to a single database are wrapped in a single round-trip.

Constraints are rarely used within the databases (215, 225, 235). Generally, constraints are useful when it helps provide simple updates with the right kind of error handing without extra queries. For example, the fully qualified domain name (FQDN) table has a constraint placed on the "name" to assist in preventing a tenant from accidentally trying to claim the same FQDN as is already allocated to a different tenant.

Caution is used when adding indices. Indices typically improve read performance at the cost of extra I/Os for write operations. Since the data within the databases is primarily RAM resident, even full table scans are relatively fast. According to an embodiment, indices may be added once the query patterns have stabilized and a performance improvement may be determined by proposed indices. According to an embodiment, if adding the index will potentially take a long time the "ONLINE=ON" option may be specified such that the table isn't locked while the index is initially built.

According to an embodiment, upgrades to databases within the cloud manager may be performed without causing downtime to the cloud manager system. In other words, even during an upgrade of the cloud manager, the cloud manager continues processing received requests. As such, changes made to the schema are to be compatible with the previous schema. The SQL schema upgrade is run before the web servers used by the cloud manager are upgraded. When the web servers are upgraded they can start to use the new features enabled in the database. Database upgrades are limited such that operations involved in the upgrade are quick and efficient. For example, tables may be added and new nullable columns may be added to existing columns. New columns may be added at the end of a table. Generally, time consuming operations to the databases are avoided. For example, adding a default value to a newly added column at creation time may be a very time consuming operation when there is a large amount of data. Adding a nullable column, however, is a very quick operation. As discussed above, adding new indices are allowed, but caution should be taken when adding a new constraint to help ensure sure that the schema upgrade won't break with the existing data. For example, when a constraint is added it may be set to a state that is not checked and avoids a costly validation of existing rows and potential errors. Old tables and unused columns are removed after a new version is being used and the cloud manager is not accessing those tables and columns.

Generally, a single row in each of the databases is used to indicate a task and/or a desired state. For example, the tenant database 235 includes a single row for each tenant. A given tenant may include a Required Version record. This record is used to help ensure that the tenant is placed on a farm running the required version. For example, for tenant 1 to stay on SharePoint 14 SP1, the required version for tenant could be set to "14.1." and any version including 14.1 would match and any other versions (e.g. 14.2.xxxx) would not match. The tenant records may include other items such as authorized number of users, quotas (e.g. allowed total data usage, per user data usage, etc.), time restrictions, and the like. Some organization might have multiple tenants that represent different geographies, organizations or capabilities. According to an embodiment, tenants are walled off from each other without explicit invitation of the users (via extranet or other features).

According to one embodiment, each tenant is locked into a specific network. Tenants are kept localized to a small set of databases. A tenant is either small (smaller than would fill one database) in which case it is in exactly one database, shared with other tenants. This implies that all the tenants sharing that database need to upgrade at the same time. When a tenant grows larger it may be moved to its own dedicated database(s) and now might have more than one, but is not sharing databases with other tenants. Maintaining a large tenant in one or more dedicated databases helps in reducing a number of databases that are needed to be upgraded simultaneously in a single upgrade.

Similarly, the work database 215 includes a single row for each job. The machine database 225 may include a row for each physical machine, VM, farm, and the like. For example, machine manager database 225 may include a version string.

According to an embodiment, each VHD, Farm, and VM within a network has an associated version string.

According to one embodiment, the cloud manager includes a simple logging system that may be configured to record a log entry for each web service call. A logging system may be implemented that includes as few/many features as desired. Generally, the logging system is used for measuring usage and performance profiling.

According to an embodiment, the Web Service APIs 240 are built using SOAP with ASP.net. The various Web Methods in the APIs follow two main patterns—Gets and Updates. Generally, the update methods take a data structure as the input and return the same structure as the output. The output structure returns the current state of the underlying object in the database, potentially differing from the input object if validation or other business logic changed some properties or else with additional properties filled in (for example record IDs or other values calculated by the cloud manager). The update methods are used for initial object creation as well as subsequent updates. In other words, callers to the web service APIs 240 can simply request the configuration they want and they don't need to keep track of whether the object already exists or not. In addition this means that updates are idempotent in that the same update call can be made twice with the identical effect to making it only once. According to an embodiment, an update method may include a LastUpdated property. When the LastUpdated property is present, the cloud manager 200 rejects the Update if the value of LastUpdate does not match the one currently stored in the database. Some Update methods include properties that are set on the first invocation of the method and are not set on other invocations of the method.

Cloud manager 200 is configured to avoid the use of callbacks. Since callbacks may be unreliable, clients interacting with cloud manager 200 may check object status using a web service API when they want to check a status of an update. According to an embodiment, a call to an update method causes cloud manager 200 to set the state of the underlying object to "Provisioning" and when the updates are completed the state is set to "Active".

Figure 3:
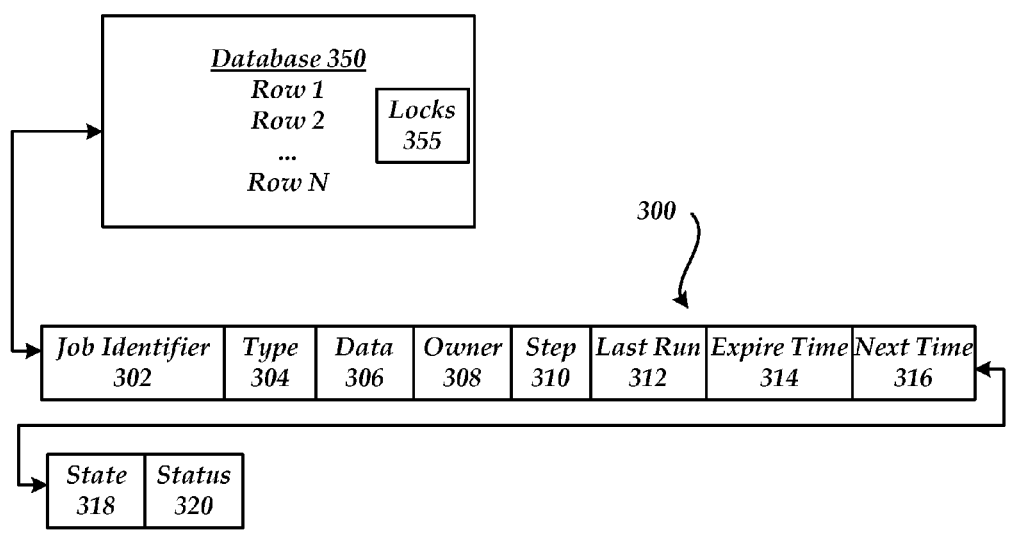
FIG. 3 shows an exemplary job record stored within a row of a database.

FIG. 3 shows an exemplary job record stored within a row of a database. As illustrated, record 300 comprises job identifier 302, type 304, data 306, owner 308, step 310, last run 312, expire time 314, next time 316, state 318 and status 320.

Generally, for each task that is requested to be performed, the cloud manager creates a record in database 350 (e.g. work database 215 in FIG. 2).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "-VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state and Status 320 indicates a status of a job (e.g. Created, Suspended, Resumed, Executing, Deleted).

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more tasks. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Figure 4:
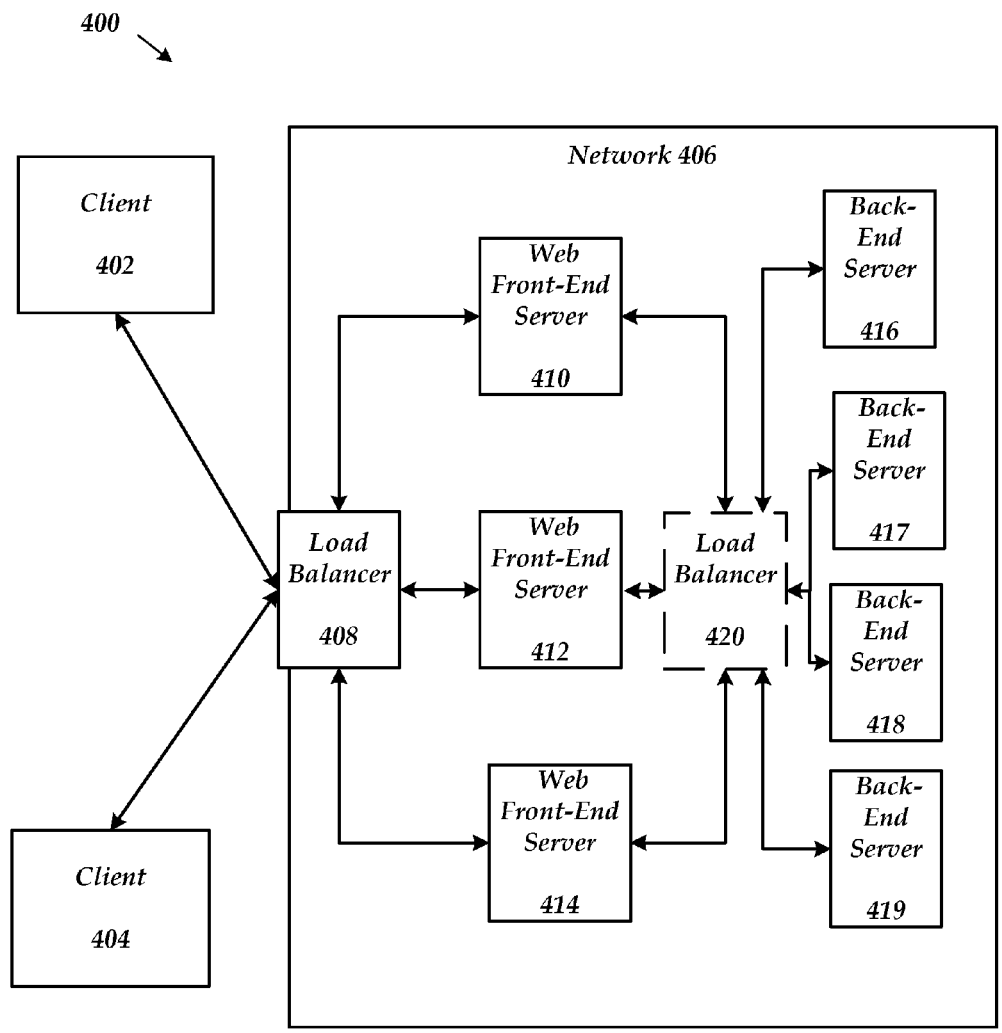
FIG. 4 shows an example system for a network including front-end and back-end servers for an online service.

FIG. 4 shows an example system 400 for a network including front-end and back-end servers for an online service. The example system 400 includes clients 402 and 404, network 406, load balancer 408, WFE servers 410, 412, 414 and back-end servers 416-419. Greater or fewer clients, WFEs, back-end servers, load balancers and networks can be used. Additionally, some of the functionality provided by the components in system 400 may be performed by other components. For example, some load balancing may be performed in the WFEs.

In example embodiments, clients 402 and 404 are computing devices, such as desktop computers, laptop computers, terminal computers, personal data assistants, or cellular telephone devices. Clients 402 and 404 can include input/output devices, a central processing unit ("CPU"), a data storage device, and a network device. In the present application, the terms client and client computer are used interchangeably.

WFEs 410, 412 and 414 are accessible to clients 402 and 404 via load balancer 408 through network 406. As discussed, the servers may be configured in farms. Back-end server 416 is accessible to WFEs 410, 412 and 414. Load balancer 408 is a dedicated network device and/or one or more server computers. Load balancer 408, 420, WFEs 410, 412 and 414 and back-end server 416 can include input/output devices, a central processing unit ("CPU"), a data storage device, and a network device. In example embodiments, network 406 is the Internet and clients 402 and 404 can access WFEs 410, 412 and 414 and resources connected to WFEs 410, 412 and 414 remotely.

In an example embodiment, system 400 is an online, browser-based document collaboration system. An example of an online, browser-based document collaboration system is Microsoft Sharepoint® from Microsoft Corporation of Redmond, Wash. In system 400, one or more of the back-end servers 416-419 are SQL servers, for example SQL Server from Microsoft Corporation of Redmond, Wash.

WFEs 410, 412 and 414 provide an interface between clients 402 and 404 and back-end servers 416-419. The load balancers 408, 420 direct requests from clients 402 and 404 to WFEs 410, 412 and 414 and from WFEs to back-end servers 416-419. The load balancer 408 uses factors such as WFE utilization, the number of connections to a WFE and overall WFE performance to determine which WFE server receives a client request. Similarly, the load balancer 420 uses factors such as back-end server utilization, the number of connections to a server and overall performance to determine which back-end server receives a request.

An example of a client request may be to access a document stored on one of the back-end servers, to edit a document stored on a back-end server (e.g. 416-419) or to store a document on back-end server. When load balancer 408 receives a client request over network 406, load balancer 408 determines which one of WFE server 410, 412 and 414 receives the client request. Similarly, load balancer 420 determines which one of the back-end servers 416-419 receive a request from the WFE servers. The back-end servers may be configured to store data for one or more tenants (i.e. customer).

Figure 5:
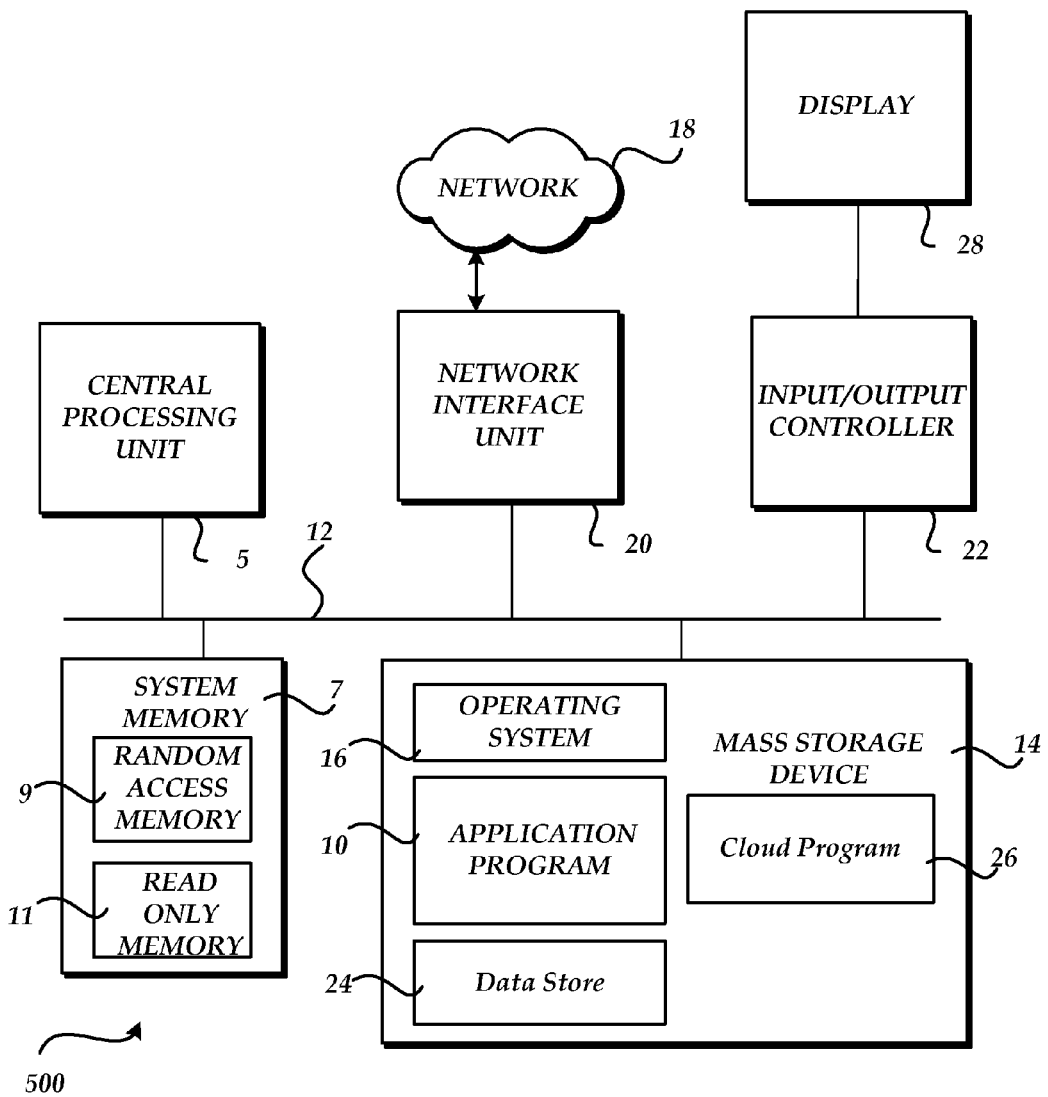
FIG. 5 illustrates a computer architecture for a computer.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 11, and a system bus 12 that couples the memory to the central processing unit ("CPU") 5.

A basic input/output system containing the basic routines that help to transfer information between elements within the computer, such as during startup, is stored in the ROM 11. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network 18, such as the Internet. The computer 500 may connect to the network 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 26, that perform tasks relating to the cloud system.

Figure 6:
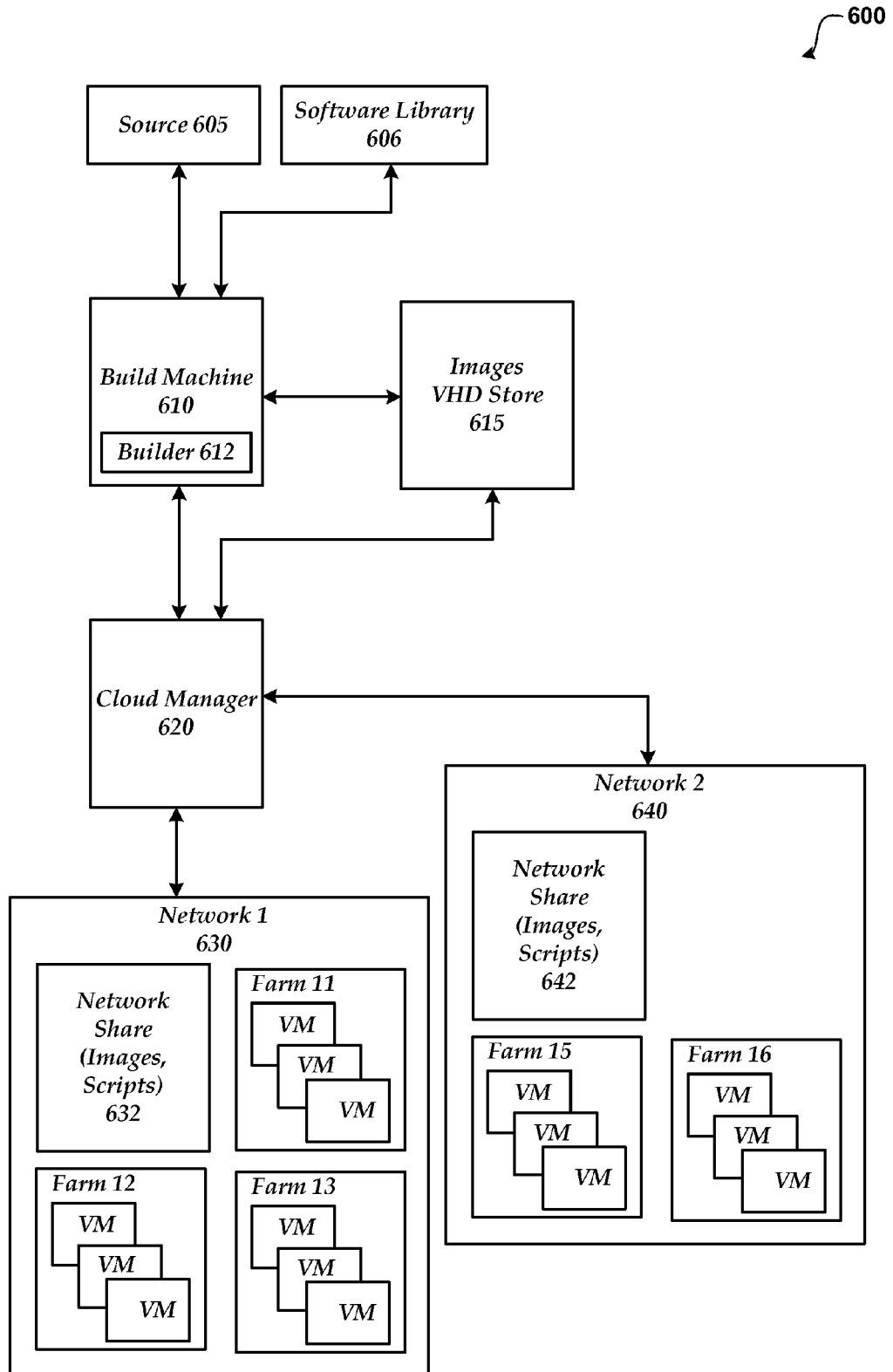
FIG. 6 shows a build system for building virtual disks that are used within an online service.

FIG. 6 shows a build system for building virtual disks that are used within an online service.

As illustrated, build system 600 comprises source code 605, software library 606, build machine 610, VHD store 615, cloud manager 620 and networks 1 and 2 (630, 640).

Build machine 610 is configured to create the VHDs that will be used within the cloud manager system to create VMs. Build machine 610 creates deployment-ready virtual hard disks (VHDs) that may be stored in VHD store 615 and used on host machines to instantiate VMs that are spread across one or more networks in farms that each may include different configurations. The build system is configured to build VHDs of differing configurations that depend on a role of the virtual machine (VM) for which the VHD will be used. For example, VMs may be created for web front ends (WFEs), SQL servers, federated service servers, active directory servers and the like. The build machine uses the VHDs to create virtual machines (VMs) in both test and production environments for the online service. According to an embodiment, the VHDs and VMs are created using MSBUILD and HYPER-V from MICROSOFT CORPORATION. Other build tools may also be utilized.

The overall build process for a VHD is controlled through a main project file (See FIG. 7 for an exemplary build file 700). The main project file includes definitions, software references, configuration operations and project files that are used in building VHDs. Using this main project file, the builder 612 (e.g. msbuild.exe) is invoked from build machine 610 to build the VHDs defined by the project files. VHDs may be automatically built when a trigger event is detected or on demand. For example, when a new version of software is detected, VHDs that utilize the new software may be automatically built. After being built, the VHDs may be automatically copied to one or more network shares that are local to a network (e.g. network share 632, network share 642) and/or some other global network share (not shown).

Figure 8:
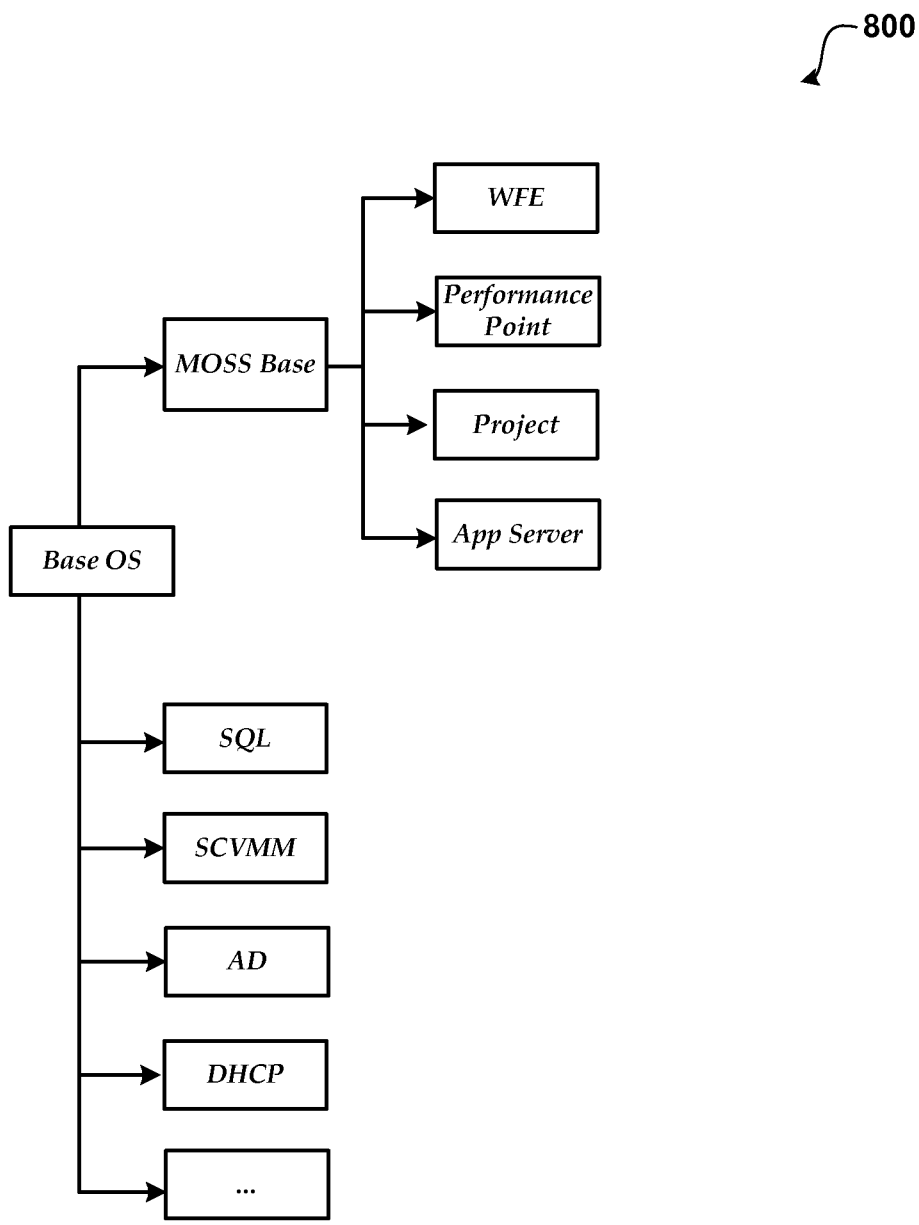
FIG. 8 illustrates an exemplary dependency tree.

During the build process, multiple VHDs may be built in parallel or in serial. For example, independent projects may be built simultaneously. A dependency tree may be used to determine the projects that may be built in parallel (See FIG. 8 for an exemplary dependency tree). The VHDs may be built using other VHDs as a starting point instead of having to be built from scratch each time. The project definitions for VHDs being built may contain references to other VHDs such that a VHD can be used as a common 'base' for many other VHDs to build on top of. In this manner, the input of one VHD project definition may be the output of another, forming a dependency tree for the overall build process. Since these dependencies are indicated in the project files themselves, the dependency management may be handled automatically by builder 612. This helps to ensure that if a prerequisite VHD has changed, then that VHD, as well as the other VHDs that depend on it will be rebuilt in the appropriate sequence.

Instead of creating and having to deploy a complete VHD each time a new set of VHDs are created, a differencing VHD may be created. A differencing VHD contains only the modified disk blocks of the associated parent VHD. The parent VHD can also be a differencing VHD. Multiple differencing VHDs create a differencing chain. Using differencing VHDs within the cloud manager system allows faster deployment of the new VHDs since not as much information is required to be moved from one network location to another network location.

During the build process, build machine 610 accesses the source code from one or more data stores (e.g. source 605) as well as software from one or more software libraries (e.g. software library 606). The builder 612 will create a temporary VM and attach a VHD. Following the instructions in the build file 700 the builder 612 copies scripts and binaries, installs the specified software, and performs the specified configuration to software and/or to the VM's operating system. At the end of the build, the builder 612 prepares the VM for general consumption. The builder 612 discards the temporary VM and then stores the built VHDs in another data store (e.g. VHD store 615). According to an embodiment, the VMs are prepared using the SYSPREP tool from MICROSOFT. In another embodiment, during the build process the builder 612 does not require a temporary VM to install software or make operating system changes. Instead, the builder 612 can mount the VHD and perform all the configuration directly on the mounted disk. The VHDs that are built may also be automatically/manually deployed to one or more other locations. For example, VHDs that are to be deployed in Network 1 (630) may be placed in network share 632 and VHDs that are to be deployed in Network 2 (640) may be placed in network share 642. When differencing VHDs are created then only the differencing VHDs may be deployed to the local network shares.

Cloud manager 620 is configured to automatically provision machines with the created virtual hard disks (VHDs). Identical VHDs can be installed directly on the machines that have already been tested. For example, each machine within one or more farms may include a same version and build of a VHD. For example, when a farm is deployed (e.g. Farm 11, 12, 13, 15, 16), cloud manager 620 may execute a job that invokes a script that includes tasks to provision the machines with the VHD that match its role within the online service. In one embodiment, VHDs used to create VMs can by dynamically expanding and converted to fixed immediately before creating a VM with them. Dynamically expanding VHDs use disk space proportional to the amount of data they contain, whereas fixed VHDs use a pre-determined, fully expanded amount. Fixed VHDs offer improved VM performance though. Farms may be created for different purposes. For example, there may be content farms, federated services farms, SQL farms, and the like. Machines may host multiple VMs that share commonalities between their VHDs. When a VM of a specified role is being created on a machine, its VHDs are copied to the machine. In one embodiment, a copy of these VHDs are stored on the machine for use by subsequent VMs that will be deployed to the machine and may share some or all of the same VHDs. This embodiment avoids network copy of common VHDs for subsequent VMs on the same machine, improving deployment time.

FIG. 7 shows an exemplary project file used in the build system.

The project files describe what items are to be built as well as how they are to be built with different platforms and configurations. The project file format also enables developers to author re-usable build rules that can be factored into separate files so that builds can be performed consistently across different projects within their product.

Referring to project file 700, PropertyGroup 710 is used to group a set of properties together. More than one property group may be in a project file and the same property may be placed in more the one PropertyGroup. When defining a PropertyGroup, optional condition attributes that specifies that the PropertyGroup will apply in a build only when the condition is met may be included.

Items are declared in the project file by creating an element with the name of the item collection as a child of an ItemGroup element 720. Items represent inputs into the build system and are grouped into item collections based on their user-defined collection names. These item collections can be used as parameters for tasks, which use the individual items contained in the collection to perform the steps of the build process.

Tasks are contained within the Target element 730. Tasks may use parameters, which are passed as attributes of the element. The item collections and properties may also be used as parameters. Targets group tasks together in a particular order and expose sections of the project file as entry points into the build process. Targets are often grouped into logical sections to allow for expansion and increase readability. Breaking the build steps into many targets allows you to call one piece of the build process from other targets without having to copy that section of code into each target. For example, if several entry points into the build process require references to be built, you can create a target that builds references and run that target from every necessary entry point.

According to an embodiment PowerShell scripts are used in the build process. For example, task execution that takes place on VMs being built is performed by using POWERSHELL remoting from the build machine host operating system to the VM itself. Other custom build tasks are also utilized. The following is a list of exemplary tasks that are created to build VHDs with VMs for the online system.

The PowerShell task is used to invoke PowerShell code. Logging and errors are fed back to the builder 612. According to an embodiment, non-recoverable errors are raised as errors, warnings and messages can be used otherwise. The parameters include script, script files and computer name. According to an embodiment, the script parameter is PowerShell code that is executed directly. The script may invoke custom code and/or call CmdLets. The script file parameters includes one or more relative or absolute paths to PowerShell script files and parameters that are executed. According to an embodiment, the paths are executed in the same order provided and in the same runspace (e.g: <path1>-param "foo"; <path2>-param "bar"). The computer name parameter is the name of the computer to run the script(s) on. A new runspace is created on the remote machine if provided. The following are exemplary tasks that are used in the build process of the VHDs.

A NewVM task creates a new virtual machine using a specified VHD file. The parameters comprise name, computer name, VHD, unattend, and passwordfile. The name parameter is the name of the virtual machine to create. The unattend parameter is the relative or absolute path to the Unattend file to use on the sysprepped VHD. The password file parameter is the relative or absolute path to the file that contains the hashed credential that will be used to connect to the VM.

A RemoveVM task removes an existing virtual machine. The parameters include name, VHD Path, and Manifest Path. The name parameter is the name of the virtual machine to remove. The Manifest Path parameter is a relative or absolute path where to output the manifest.

A Start VM task starts up the specified virtual machine and includes a name parameter that specifies a name of the VM to start.

A Shutdown VM task shuts the specified virtual machine down. The parameters include name and sysprep. The name parameter is the name of the virtual machine to shutdown. The sysprep parameter indicates if the virtual machine is to be sysprepped before shutdown.

A New VHD task creates a new VHD at the specified path. If an ISO and optional unattend parameters are provided, the new VHD task transparently creates a new VM with the ISO and unattend parameters, syspreps it, and commits those changes to the VHD. The parameters include VHD Path, size, fixed, ISO and unattend. The VHD Path parameter is an absolute or relative local path of where to create the VHD file. The size parameter is the size, in MB, of the VHD that will be created. The fixed parameter is whether or not the VHD created will be fixed or dynamic. The ISO parameter is a relative or absolute path to the OS ISO image that is used to create the VHD. The unattend parameter is a relative or absolute path to the unattend file used to install the ISO.

A Mount VHD task mounts a VHD to the local filesystem so its contents can be manipulated. The parameters include a VHDPath and a Mount path. The VHD path parameter is a relative or absolute path to the VHD file to mount. The mount path parameter is an absolute path to mount the VHD.

A Unmount VHD task unmounts a previously mounted VHD file. The parameters include a VHD path parameter that is a relative or absolute path to the VHD file to unmount.

Figure 9:
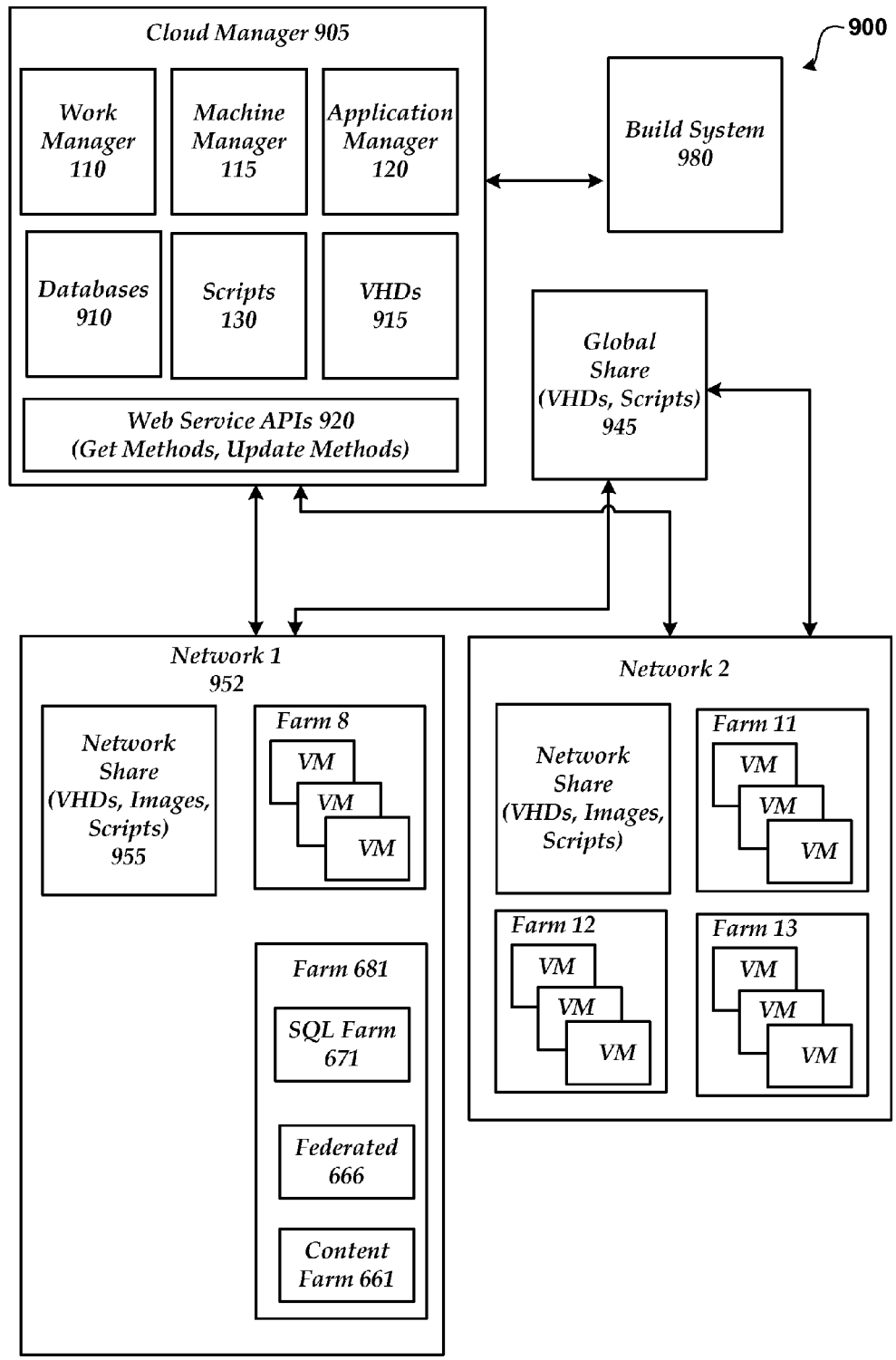
FIG. 9 shows a cloud manager for an online service that provisions VHDs that are created by a build system.

FIG. 9 shows a cloud manager for an online service that provisions VHDs that are created by a build system.

Cloud manager 905 is used in deploying, configuring and managing the networks for the online service. The cloud manager is configured to receive requests through an idempotent and asynchronous application web service application programming interface (API) 920 that cannot rely on a reliable network.

As illustrated, cloud manager 905 comprises work manager 110, machine manager 115, application specific manager 120, scripts 130, databases 910, scripts 130, VHDs 915 and web service APIs 920. According to one embodiment, application manager 120 is a SharePoint tenant manager that comprises SharePoint specific logic.

Requests using APIs 920 may be used in the management and the deployment of servers in various topologies across different networks (Network 1, Network 2). While only two networks are shown, many more networks are generally managed (e.g. ten, one hundred, one thousand, ten thousand, and the like). Cloud manager 905 operates and is configured similarly to the cloud manager system shown and described above. The web service APIs 920 includes methods to request services from work manager 110, machine manager 115 and application manager 120. For example, requests may be made using APIs 920 to update a tenant in a database, add a new SQL server, deploy a new farm, add a new machine, update a VM, obtain values within a data store, and the like.

The Web Service APIs 920 are designed to work in the context of a scalable global service. As network requests are assumed to be inherently unreliable, the APIs assume that any network request might fail and/or hang in transit. Requests using the Web Service APIs 920 are configured to be idempotent. In other words, the same call with the same parameters may be made utilizing the Web Service APIs 920 without changing the outcome.

Cloud manager 905 is designed to do very little processing (<10 ms, <50 ms) before returning a response to any given request. Cloud manager 905 maintains records to keep track of currently requests. For example, cloud manager 905 updates records in a local database and if necessary schedules a "job" to perform more lengthy activity later. Once the parameters and job information are committed to the database, the response is sent to the requestor. According to an embodiment, the Web Service APIs 920 are built using SOAP with ASP.net.

VHDs 915 are configured to store Virtual Hard Disk (VHD) images that are in use and/or are to be deployed on one or more of the machines in one or more of the networks. The VHDs are created using a central build system 980 as described herein. According to an embodiment, the MICROSOFT® VHD file format is used that specifies a virtual machine hard disk that can reside on a native host file system encapsulated within a single file. Generally, the VHD format is broadly applicable since it is agnostic to the virtualization technology, host operating system, or guest operating system with which it is used. VHDs that are used within a specific network may be moved to a global share 945 and/or to a network share that is local to a network (e.g. network share 955). Storing the VHDs on a network share saves time in a deployment of images since network communication time is reduced. An update method may be used to update the VHDs within VHDs 945 and/or in one of the global/network shares.

Figure 10:
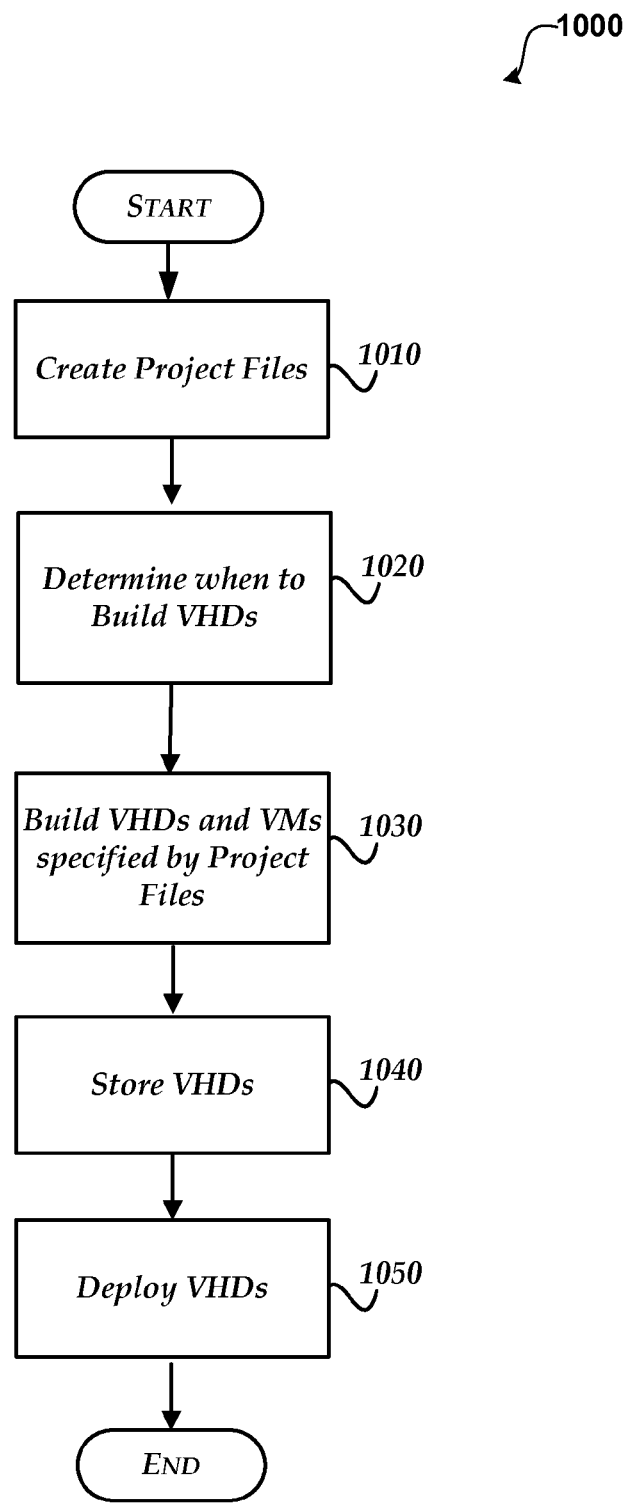
FIG. 10 shows a process for building VHDs that are to be deployed in an online system.

FIG. 10 shows a process for building VHDs that are to be deployed in an online system.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 1000 flows to operation 1010, where a build project is created that specifies the creation of an operating environment including a virtual machine that is to be included on a virtual hard disk. The build project includes one or more project files that describe what items are to be built as well as how they are to be built with different platforms and configurations.

Moving to operation 1020, a determination is made as to when to build the VHDs. The build process for the VHDs may be manually started and/or automatically started that is based on a triggering event. The triggering event may be related to many different events. For example, one or more of the following events may be used as a triggering event: a source code change, a specific date, a new farm request, a new machine request, a new type of VM defined, and the like. According to an embodiment, when a new version of source code is detected, the build process for the VHDs is started.

Flowing to operation 1030, the VHDs and VMs that are specified by the project and files within the project are built. During the build process, a build machine accesses the referenced source code and software to create the VHDs for the online system. The VHDs that are created may be full VHD and/or differencing VHDs. For example, differencing VHDs may be used after a base VHD has been created.

Transitioning to operation 1040, the created VHDs are stored. The VHDs may be stored in one or more locations. The VHDs may be stored in a data store that is associated with the build machine, local data stores for one or more of the networks in the online system, a global data store, and the like. For example, once created, the VHDs may be automatically placed in the data shares that are local to the networks in which they will be provisioned.

Moving to operation 1050, the VHDs may be automatically placed and started on machines within the networks. For example, the cloud manager system may request a job to deploy a new machine, farm, and the like.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for building virtual hard disks for deployment in an online system, comprising:
   accessing a build project that specifies actions to perform to create a set of deployment ready virtual hard disks (VHDs) for remote deployment in an online service that comprises disparate networks that include machines arranged in farms;
   automatically building a dependency tree from the build project to determine an order in which to build the VHDs;
   detecting, by a computing device, a trigger event, comprising at least one of: a new version of software is detected, a specific date, a new farm request, a new machine request, and a new type of VM is defined;
   automatically building the VHDs according to the build order determined by the dependency tree using the build project in response to the trigger event; wherein different VHDs within the build project are created based on a role of a virtual machine; and
   storing the VHDs in a data store for automatic deployment.

2. The method of claim 1, further comprising automatically starting the VHDs on machines within a network.

3. The method of claim 2, wherein the trigger event is the source code update that is used in building the VHDs.

4. The method of claim 2, further comprising deploying identical VHDs on machines within at least one of the farms.

5. The method of claim 1, wherein a project definition for a VHD includes a reference to a base VHD that is used as a base for building other VHDs.

6. The method of claim 3, wherein automatically building the VHDs comprises building differencing VHDs that contain modified disk blocks of an associated parent VHD.

7. The method of claim 6, further comprising automatically storing the differencing VHDs in local data shares in at least one of the disparate networks.

8. The method of claim 1, wherein scripts are used to perform tasks that are specified within the build project, wherein the tasks comprise a run script task, a new virtual machine task, a remove virtual machine task, a start virtual machine task, a shutdown virtual machine task, a new VHD task, a mount VHD task, and an unmount VHD task.

9. A computer-readable storage medium, excluding a signal, having computer-executable instructions for building virtual hard disks for deployment in an online system, comprising:
   accessing a build project that specifies actions to perform to create a set of virtual hard disks (VHDs) and virtual machines (VMs) for remote deployment in an online service that comprises disparate networks that include machines arranged in farms;
   detecting, by a machine within a central service that deploys and manages the machines for the online service, a trigger event, comprising at least one of: a new version of software is detected, a specific date, a new farm request, a new machine request, and a new type of VM is defined;
   automatically determining an order in which to build the VHDs based on dependencies from a dependency tree indicated in the build project;
   automatically building the VHDs using the build project using the machine within the central service in response to the trigger event;
   storing the VHDs in a data store for automatic deployment; and
   automatically deploying the VHDs to machines in the online service, wherein the VHDs are installed on machines in response to a command received from a remote machine in the central service.

10. The computer-readable storage medium of claim 9, further comprising automatically starting the VHDS on machines within a network.

11. The computer-readable storage medium of claim 9, wherein a project definition for a VHD includes a reference to a base VHD that is used as a base for building other VHDs.

12. The computer-readable storage medium of claim 10, wherein automatically building the VHDs comprises building differencing VHDs that contain modified disk blocks of an associated parent VHD.

13. The computer-readable storage medium of claim 12, further comprising storing the differencing VHDs locally on at least one of the disparate networks.

14. The computer-readable storage medium of claim 9, wherein scripts are used to perform tasks that are specified within the build project, wherein the tasks comprise a run script task, a new virtual machine task, a remove virtual machine task, a start virtual machine task, a shutdown virtual machine task, a new VHD task, a mount VHD task, and an unmount VHD task.

15. A system for building virtual hard disks for deployment in an online service, comprising:
   a cloud manager coupled to multiple different networks that is operative to manage deployment of machines and configuration of the networks and that automatically deploys virtual hard disks (VHDs) to machines in the online service;

a data store in each of the different networks that is used to store virtual hard disks that are used in deployment of machines within that network; and a build machine, comprising:

a processor and a computer-readable medium;

an operating environment stored on the computer-readable medium and executing on the processor; and instructions stored on the computer-readable medium that, when executed by the processor, cause the build machine to:

access a build project that specifies actions to perform to create a set of virtual hard disks (VHDs) and virtual machines (VMs) for remote deployment;

detect a trigger event, comprising at least one of: a new version of software is detected, a specific date, a new farm request, a new machine request, and a new type of VM is defined;

automatically determine an order in which to build the VHDs based on dependencies from a dependency tree indicated in the build project;

automatically build the VHDs using the build project in response to the trigger event; and store the VHDs in a data store for automatic deployment.

16. The system of claim 15, further comprising automatically starting the VHDs on machines within a network.

17. The system of claim 15, wherein scripts are used to perform tasks that are specified within the build project, wherein the tasks comprise a run script task, a new virtual machine task, a remove virtual machine task, a start virtual machine task, a shutdown virtual machine task, a new VHD task, a mount VHD task, and an unmount VHD task.

* * * * *